Sept. 23, 1952  L. T. ASKREN ET AL  2,611,283
PLURAL PULLEY MECHANISM
Filed June 27, 1950
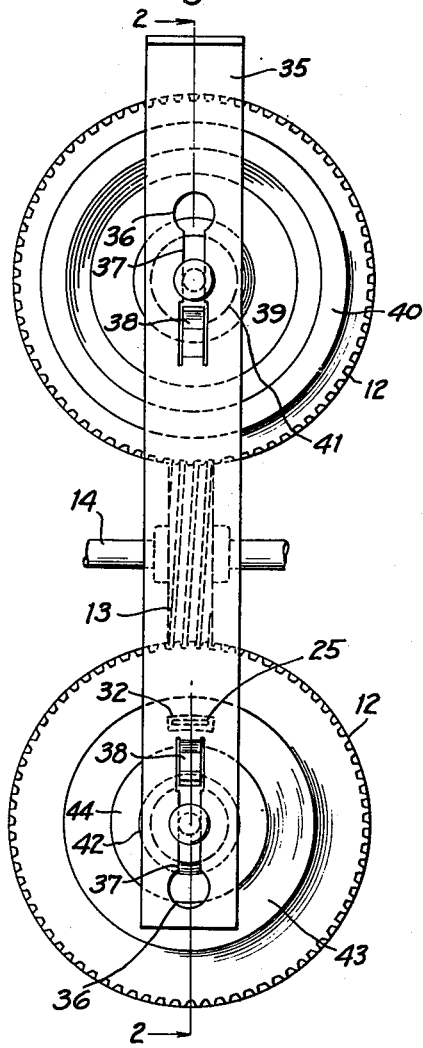
Fig. 1.
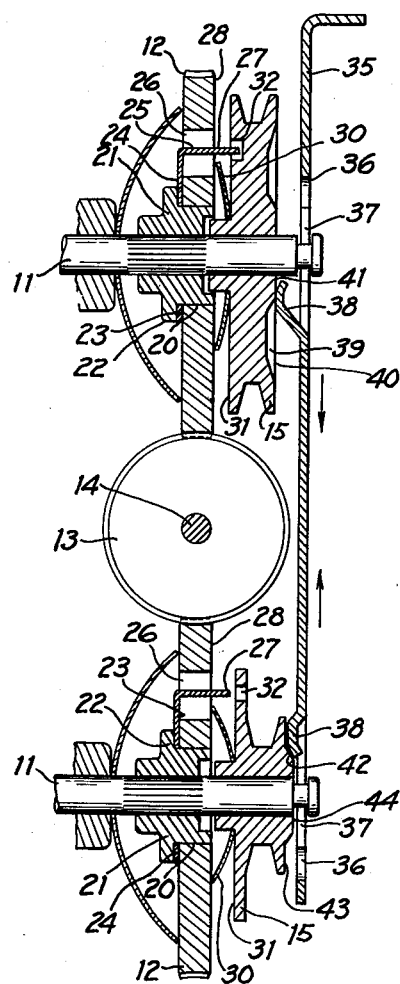
Fig. 2.
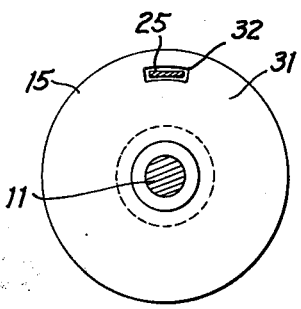
Fig. 3.
Fig. 4.
Lee T. Askren
Robert J. Roman
Inventors
Daniel J. Mayne
By
J. Griffin Little
Attorneys Patented Sept. 23, 1952

2,611,283

UNITED STATES PATENT OFFICE 2,611,283

PLURAL PULLEY MECHANISM

Lee T. Askren and Robert J. Roman, Rochester, N. Y., assignors to Eastman Kodak Company, Rochester, N. Y., a corporation of New Jersey Application June 27, 1950, Serial No. 170,496

6 Claims. (Cl. 74—665)

The present invention relates to motion picture projectors, and more particularly to a mechanism by which the supply and take-up reel spindles may be connected selectively to the main drive of the projector.

As is well known, projectors are provided with film-moving sprockets which are carried by separate shafts positioned on opposite sides of the film gate. Each of these shafts has mounted thereon a spur gear which is connected to the shutter shaft worm so that both sprocket shafts are driven simultaneously but in opposite directions. Each shutter shaft also has mounted thereon a pulley which is connected by a belt to one of the reel spindles. Means is provided for connecting one of the pulleys selectively to its associated gear so that one pulley will be driven positively so as to drive the proper reel spindle, the other pulley being disconnected from its gear and idles, as is well known.

The present invention provides a simple, novel clutch mechanism for connecting each pulley releasably to its associated gear so as to be driven thereby. In addition an actuating lever serves to connect the pulleys selectively so that one of the pulleys will be driven positively while the other pulley idles.

The present invention has, therefore, as its principal object, a novel, simplified clutch arrangement for connecting the pulleys releasably to their cooperating gears.

A further object of the invention is the provision of a clutch which comprises few parts of rugged construction, is simple in operation, and highly effective in its results.

A still further object of the invention is the provision of improved shifting means for the pulleys.

Yet another object of the invention is the provision of a shifting means which, when moved in one direction, will shift the pulley into a clutching relation with its gear; and when moved in another direction, serves as a limiting stop for the pulley to position the latter on the sprocket shaft.

To these and other ends, the invention resides in certain improvements and combinations of parts all as will be hereinafter more fully described, the novel features being pointed out in the claims at the end of the specification.

In the drawings:

Fig. 1 is a side elevation view of the two sprocket shafts showing the relation thereto of the actuating lever of the present invention;

Fig. 2 is a vertical sectional view taken substantially on line 2—2 of Fig. 1, showing the relation of the parts when the upper pulley is engaged and the lower pulley is disengaged;

Fig. 3 is a side view of one of the pulleys illustrated in Fig. 2 showing the relation thereto of the flexible finger for clutching the gear to its associated pulley; and Fig. 4 is a sectional view of a portion of the mechanism illustrated in Fig. 2 and with the pulley slid towards its gear but before the pulley is actually connected thereto.

Similar reference numerals throughout the various views indicate the same parts.

The drawings show a pair of parallel sprocket shafts 11 which, as is well known, are positioned on opposite sides of the projection aperture, not shown. Each shaft has mounted thereon, for rotation as a unit therewith, a spur gear 12. A worm gear 13 is mounted on the shutter shaft 14, and is connected to both gears 12 as shown in Figs. 1 and 2 so as to rotate both shafts 11 and gears 12 simultaneously but in opposite directions, as is deemed apparent. The structure so far described may be of any suitable and well known design and forms no part of the present invention.

Each shaft 11 also has slidably mounted thereon a pulley 15 which may be connected by a belt, not shown, to one of the reel spindles, not shown, to drive the spindle. The upper pulley is connected to the supply or upper reel spindle, while the lower pulley is connected to the lower or take-up spindle. As is apparent, only one pulley at a time will be connected in driving relation with its associated reel spindle, and the other pulley and its reel will idle.

In order that the pulleys may be driven selectively, the present invention provides means by which the pulleys may be clutched selectively to the rotating gears 12. To this end, each gear 12 is formed with a central aperture 20 in which is positioned a plug 21 which is connected to and acts as a bearing to support the gear 12 on shaft 11. Each plug 21 is formed with an annular flange 22 positioned adjacent but spaced slightly from the left face 23 of its gear 12 and opposite the pulley 15, as clearly shown in Figs. 2 and 4. The space between the flange 22 and the face 23 has positioned therein a washer 24 which is formed to provide a radially-extending finger 25 which is bent normal to the plane of the washer and projects through a registering opening 26 formed in gear 12. As shown in Figs. 2 and 4, the end 27 of each finger projects a substantial distance beyond the opposite or right face 28 of each gear 12. Thus, the finger 25 forms a flexible, axially-movable member, the purpose of which will be later described.

Each pulley 15 is mounted loosely on its shaft 11 so as to be slidable axially thereof to connect and disconnect the pulley from its associated gear 12. A yieldable member such, for example, as a bowed spring washer 30 is positioned between the right face 28 of each gear and the adjacent left face 31 of the cooperating pulley. Each washer 30 is concave to the left and tends to move or shift the pulley 15 to the right, as viewed in Fig. 2, to disconnect the pulley from its associated gear 12. The left face 31 of each pulley is formed with a recess or opening 32 adapted to receive the end 27 of the finger 25 to clutch the pulley 15 in driven relation with its gear 12. Thus, when the pulley 15 is slid to the left, by means to be later described, the opening 32 will be positioned to receive the end 27 to connect the pulley 15 to gear 12, as is deemed apparent from an inspection of Fig. 2. In case the opening 32 is not in axial alignment with the end 27, the leftward movement of the pulley 15 will cause the left face 31 thereof to engage the end 27. Further leftward movement of the pulley will cause the finger to flex axially or to the left, as shown in Fig. 4.

As the gear 12 is rotating, the end 27 of the finger 25 will ride along the left face 31 of the pulley 15 until the end 27 finally registers with the opening 32, whereupon the finger 25 will flex to the right to move the end 27 thereof into the recess 32 to connect or clutch the pulley in driven relation with its gear. Then, the gear 12 will rotate the pulley 15 as a unit therewith, and the latter, through its connecting belt, will drive the proper reel spindle. When one pulley is connected, obviously the other pulley is disconnected and its bowed spring 30 will shift the disconnected pulley to the right to disengage or declutch the pulley from its gear, so that the disengaged gear will idle, as shown at the bottom of Fig. 2.

As mentioned above, only one pulley at a time is connected. To secure this result the present invention provides an actuating member or lever which, when moved to one position, engages and slides one pulley into engagement with its gear, and at the same time the other pulley is freed and is moved to an inoperative position by means of its bowed spring 30. However, when the lever is slid in the opposite direction, the previously disengaged pulley is clutched to its gear, and the engaged pulley is then released. Thus, by moving the lever selectively to either of its positions, the proper pulley will be connected to its gear so that the required reel spindle will be driven.

To this end a flat actuating member or lever 35 is mounted for radially sliding movement on reduced end portions of the two shafts 11, as best shown in Fig. 2. The lever 35 is formed with a pair of keyhole slots each of which is formed with an enlarged end 36 of sufficient size to permit the passage of the shaft 11 therethrough. Thereupon, the lever is slid vertically or radially of the shafts to position the ends of the latter in the narrow portion 37 of the slots, as shown in Fig. 1, to connect the lever 35 releasably to both shafts 11.

In order to move the pulleys 15 selectively into clutching relation, the lever 35 is formed with a pair of pulley-moving members which, in the preferred embodiment, are in the form of lugs or cams 38 stuck up from the material of the lever and projecting to the left, as shown in Fig. 2. It is apparent from an inspection of Fig. 2 that if the lever 35 is moved upward the upper cam 38 will move out of an annular recess 39 formed on face 40 of the upper pulley and will finally engage a central flange or hub 41 thereon. Such engagement will serve to move or shift the upper pulley 15 axially and to the left so as to engage the finger 25 in opening 32 to clutch the upper pulley to its gear. When the upper pulley is thus engaged the lever 35 simultaneously moves the lower cam 38 upward and out of engagement with a hub or flange 44 formed on the right face 43 of the lower pulley and against an inclined shoulder 42 formed on face 43. When the lower cam is positioned on the shoulder 42, the lower bowed spring 30 will then become operative to shift the lower pulley to the right to disconnect this pulley from its gear. Thus, the upward movement of the actuating lever 35 will connect the upper pulley and simultaneously disconnect the lower pulley. The parts are then in a position for rewinding, and the upper pulley and the upper reel spindle will be driven positively while the lower pulley and lower reel spindle will idle.

However, when the film is to be moved in projecting relation through the projector, the lower reel spindle must be driven to wind up the projected film. In this case the upper spindle and pulley will idle. To secure this result, the lever 35 must be moved downwardly. Such movement will shift the upper cam 38 downward and into axial registration with recess 39 to move the upper cam out of holding relation with the upper pulley to free the latter. The freed upper pulley then moves to the right, under the action of the tension-bowed spring, to shift the upper pulley to the right to disengage the latter from finger 25 and the upper gear 12. Such downward movement of the lever 35 simultaneously moves the lower cam 38 downward along the inclined face 42 and into engagement with flange 44 to shift the lower pulley to the left and into clutching relation with its gear, so that the lower pulley and the lower spindle will be connected in driving relation with the lower gear 12. Such leftward movement of the lower pulley will flex and tension the lower bowed spring 30.

Thus, when the lever is slid upward, the upper pulley is clutched or connected in driven relation with the upper rotating gear, and the lower pulley and its associates spindle idle. However, the downward movement of the lever 35 allows the upper pulley to become disconnected and simultaneously connects the lower pulley. Such connections serve to tension the bowed springs. Thus, the reel spindles may be connected selectively in driven relation merely by the proper positioning of the lever 35. In addition to moving the pulleys to the left and into driven relation with their gears 12, the cams 38 also serve to limit the rightward movement of the pulleys when disconnected so as to position the pulleys on the shaft. Therefore, cams 38 act both as moving as well as positioning means for the pulleys, as is deemed apparent from an inspection of Fig. 2. By means of the above-described apparatus either of the reel spindles may be connected selectively to the drive means for the projector, while the other pulley and reel are disconnected so that only one spindle will be driven at a time. By means of this arrangement the proper reel spindle will be rotated to accomplish the desired winding operation. The shifting mechanism is simple, rugged, easy to use, and highly effective in its results.

While one embodiment of the invention has been disclosed, it is to be understood that the inventive idea may be carried out in a number of ways. Therefore, the present application is not to be limited except as necessitated by the scope of the appended claims.

What we claim and desire to secure by Letters Patent of the United States is:

1. In a motion picture apparatus, the combination with a drive shaft, a member secured to said shaft, an axially movable pulley loosely mounted on said shaft adjacent said member, of a clutch for connecting said pulley releasably to said member, said clutch comprising a plate secured to the side of said member away from said pulley, said member being formed with an axially extending opening extending therethrough, an axially yieldable finger formed from said plate and extending through said opening and projecting axially beyond the other side of said member and toward said pulley, the latter being formed with a recess on the side thereof toward said member and in radial alignment with said finger, a bowed spring positioned between said member and pulley and tending to move the latter axially in one direction and away from said member, an actuator slidably mounted on said shaft adjacent the other side of said pulley, means for moving said actuator in a plane normal to the axis of said shaft, and a cam formed on said actuator and projecting laterally therefrom toward said pulley, the movement of said actuator to one position bringing said cam into engagement with said pulley to move the latter axially in the opposite direction and toward said member until said finger engages in said recess to clutch said pulley to said member, such engagement tensioning said bowed spring, the movement of said actuator to another position shifting said cam out of engagement with said pulley so that said tensioned bowed spring may move said pulley in said one direction to disengage said finger from said recess to disconnect said pulley from said member, said cam being positioned to limit the axial movement of said pulley by said bowed spring.

2. In a motion picture apparatus, the combination with a pair of parallel shafts, a gear connected to each of said shafts, means connected to said gears to rotate the gears simultaneously but in opposite directions, a pulley loosely mounted on each shaft adjacent the gear thereon, of separate means for connecting each pulley releasably to its associated gear so as to be driven thereby, an actuating lever slidably mounted on said shafts for movement normal to the axes thereof, means on said lever for sliding said pulleys selectively toward said gears to engage one of said connecting means to connect one of said pulleys to its associated gear, and means independent of the lever for sliding the other pulley away from its associated gear to disconnect said other pulley.

3. In a motion picture apparatus, the combination with a pair of parallel shafts, a gear connected to each of said shafts, means connected to said gears to rotate the gears simultaneously but in opposite directions, a pulley loosely mounted on each shaft adjacent the gear thereon, of separate means for connecting each pulley releasably to its associated gear so as to be driven thereby, an actuating lever slidably mounted on said shafts for movement normal to the axes thereof, a pair of cams formed on said lever adjacent said pulleys, means for sliding said lever in one direction to cause one of said cams to engage and slide one of said pulleys toward its associated gear so as to be connected to the latter, means for sliding the other pulley simultaneously away from its associated gear to disconnect said other pulley, and means associated with the disconnected pulley to retain said lever in adjusted position.

4. In a motion picture apparatus, the combination with a pair of parallel shafts, a gear connected to each of said shafts, means connected to said gears to rotate the gears simultaneously but in opposite directions, a pulley loosely mounted on each shaft adjacent the gear thereon, of separate means for connecting each pulley releasably to its associated gear so as to be driven thereby, an actuating lever slidably mounted on said shafts for movement normal to the axes thereof, a pair of cams formed on said lever adjacent said pulley, means for sliding said lever in one direction to cause one of said cams to engage and slide one of said pulleys towards its associated gear so as to be connected to the latter, means for sliding the other pulley simultaneously away from its associated gear to disconnect said other pulley, and means on the disconnected pulley cooperating with the other cam to retain said lever in its adjusted position.

5. In a motion picture apparatus, the combination with a pair of parallel shafts, a gear connected to each of said shafts, means connected to said gears to rotate the gears simultaneously but in opposite directions, a pulley loosely mounted on each shaft adjacent the gear thereon, of clutches for separately and releasably connecting each pulley to its associated gear, yieldable means positioned between each gear and its associated pulley and tending to slide the latter away from its gear to disconnect said clutches, an actuating lever slidably positioned on said shafts for movement normal to the axes thereof, means for sliding said lever selectively to one of two positions, a pair of cams formed on said lever, the sliding of said lever to one of said positions serving to bring one of said cams into engagment with one of said pulleys to slide the latter toward its gear to engage the associated clutch to connect said one pulley to its gear, such movement of said lever serving to move the other cam out of moving relation with the other pulley to render the associated yieldable means operative to slide said other pulley away from its gear to disengage the other clutch to free said other pulley, means on said disconnected pulley engaging said other cam to retain said lever in said one position and to position the disconnected pulley on its shaft, the sliding of said lever to the other position serving to move said one cam away from said one pulley to render the yieldable means associated therewith operative to slide said one pulley away from its gear to disconnect its connecting clutch to free said one pulley and simultaneously to move said other cam into engagement with said other pulley to slide the latter towards its gear to engage said other clutch to connect said other pulley, and means on said one pulley cooperating with said first cam for retaining said lever releasably in said second position and to position the said one pulley on its shaft.

6. In a motion picture apparatus, the combination with a drive shaft, a drive member secured to said shaft for rotation therewith, of a driven member loosely mounted on said shaft, a washer secured to the side of said drive member away from said driven member, said drive member being formed with an axially extending opening radially spaced from said shaft, an axially extending yieldable finger formed on said member passing through said opening and projecting beyond the side of said drive member adjacent said driven member, said driven member having an axially extending recess formed in the side thereof facing said drive member and positionable in radial alignment with said finger, a lever mounted for radially sliding movement on said shaft, an axially extending cam formed from the material of said lever adapted to engage and shift said driven member toward said drive member to engage said finger in said recess when said lever is slid radially in one direction on said shaft, the sliding of said lever radially in the opposite direction moving said cam out of engagement with said driven member to free the latter, and spring means carried by said shaft and positioned between said members to move the freed driven member axially along said shaft and away from said drive member to withdraw said finger from said recess to disconnect said member.

LEE T. ASKREN.
ROBERT J. ROMAN.

REFERENCES CITED

The following references are of record in the file of this patent:

UNITED STATES PATENTS

| Number | Name | Date |
| --- | --- | --- |
| 312,911 | Simmerly | Feb. 24, 1885 |
| 739,262 | James et al. | Sept. 15, 1903 |
| 938,474 | Glass | Nov. 2, 1909 |
| 1,311,299 | Therein | July 29, 1919 |
| 1,341,796 | Gorman | June 1, 1920 |
| 1,382,406 | Beadle | June 21, 1921 |
| 2,336,642 | Schreck | Dec. 14, 1943 |
| 2,354,204 | Gentry | July 25, 1944 |
| 2,373,663 | Drake | Apr. 17, 1945 |

FOREIGN PATENTS

| Number | Country | Date |
| --- | --- | --- |
| 173,484 | Switzerland | Feb. 16, 1935 |